March 10, 1964 — G. H. SULLIVAN ETAL — 3,124,132

DYNAMIC FLUID PRESSURE TRANSDUCER

Filed Dec. 13, 1961

INVENTORS
GEORGE H. SULLIVAN
ALAN D. BREDON
BY
R. E. Geauque
ATTORNEY

United States Patent Office 3,124,132
Patented Mar. 10, 1964

3,124,132
DYNAMIC FLUID PRESSURE TRANSDUCER
George H. Sullivan, Sherman Oaks, and Alan Dale Bredon, Granada Hills, Calif., assignors to Spacelabs, Inc., Van Nuys, Calif., a corporation of California
Filed Dec. 13, 1961, Ser. No. 158,960
7 Claims. (Cl. 128—205)

This invention relates to transducer means for providing an electrical signal in response to variations in fluid pressure and more particularly to a fluid pressure transducer for continuously monitoring blood pressure.

The blood pressure transducer of the present invention is particularly applicable to the continuous monitoring of systolic and diastolic blood pressure in test subjects in bio-astronautic research. In the measurement of pressure in physiological research, it is often desirable to insert a pressure pickup transducer directly into the fluid conduit, such as in a blood vein, artery, or other vessel, canal, etc. whereby the pressure, positive or negative, with respect to a reference pressure, may be obtained. In order to make this possible, such a pressure pickup must be very small. The transducer design of the present invention makes feasible the construction of such small size pressure pickups. If desired, however, the transducer may be constructed in any predetermined size best suited for the intended use.

It is usually desirable in bio-astronautic research to measure, with great accuracy, the dynamic characteristics of the circulatory system. To achieve this end, the present invention is responsive to small changes in fluid pressure and also has a high frequency response.

A problem frequently encountered in internal instrumentation is that of blood clotting. The novel mechanical techniques employed in the present invention obviate the use of chemical means for overcoming clotting and thereby prevent undesirable changes from occurring in the normal blood clotting mechanism.

It is therefore a principal object of the invention to provide a novel and improved fluid pressure transducer.

Another object of the invention is to provide a novel and improved fluid pressure pickup of small size having high frequency response.

Another object of the invention is to provide a variable-resistance pressure-measuring transducer adapted to meet the size requirements to which the device is to be put and in particular capable of being made in such small sizes as to permit it to be positioned directly in a blood vessel for monitoring blood pressure.

Yet another object of the invention is to provide novel and improved apparatus useful in the dynamic measurement of blood pressure.

A general object of this invention is to provide a new and improved fluid pressure responsive transducer which overcomes disadvantages of previous means and methods heretofore intended to accomplish generally similar purposes.

The useful applications of a device of this type are many and such applications will become apparent to those skilled in the art; for purposes of setting forth the basic principles of the present invention, its application to the measurement of aortic blood pressure will be described in detail. In this instance, the transducer is grafted directly into the aorta of the animal to sense the pressure of the blood flowing through the device. All parts of the apparatus in direct contact with the blood stream are biologically inert, thus eliminating any clotting problem arising from the generation of fibrin emboli. Furthermore, the device is compatible with the ingrowth of fibrous tissue as will be discussed more fully hereinafter.

The simple construction and the minimal number of parts involved in the transducer of the present invention assure an unusually high degree of reliability.

The invention will be understood more completely from the following detailed description taken in conjunction with the drawings, in which.

Figure 1:
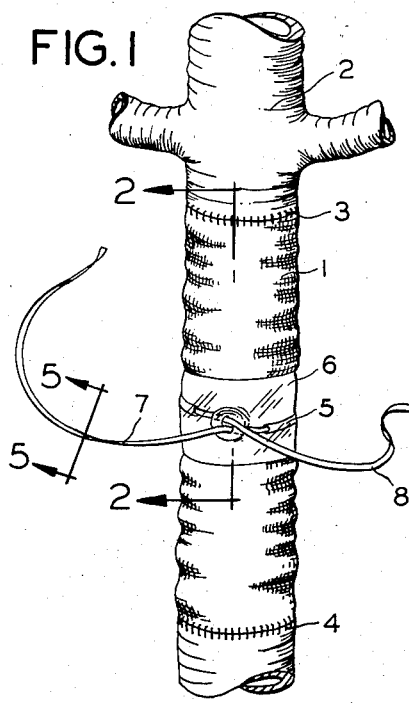
FIGURE 1 is a perspective view of a preferred embodiment of the apparatus illustrating the manner in which it is grafted into a bifurcated blood vessel.

Looking now at FIGURE 1, there is shown a preferred embodiment of the invention applied to the measurement of blood pressure in the aorta. It is inserted in the aorta using an aortic graft. The aortic graft comprises a short tubular member 1 which serves as a flow conduit. The aorta 2 is severed and member 1 is inserted between the ends of the severed aorta thereby placing the device in a series arrangement whereby all aortic blood flow must pass therethrough. Any suitable technique of anastomosis may be employed during insertion of the graft, as will be apparent to those skilled in the art. A satisfactory method of attachment may be obtained by employing continuous through and through sutures 3 and 4. The tubular member 1 is knitted or woven, and may be fabricated from various synthetic fiber materials such as Ivalon, nylon, Orlon, Dacron, or Teflon which are fashioned into a tube by different methods including braiding, knitting, and weaving. In the preferred embodiment of the present invention, it has been found that seamless tubular fabric of Dacron is the most satisfactory and that the knitted type of fabric construction is preferable to the woven type. By way of example, tubular member 1 of the present invention is described hereinafter in terms of a knitted graft. The tubular member is seamless.

Figure 2:
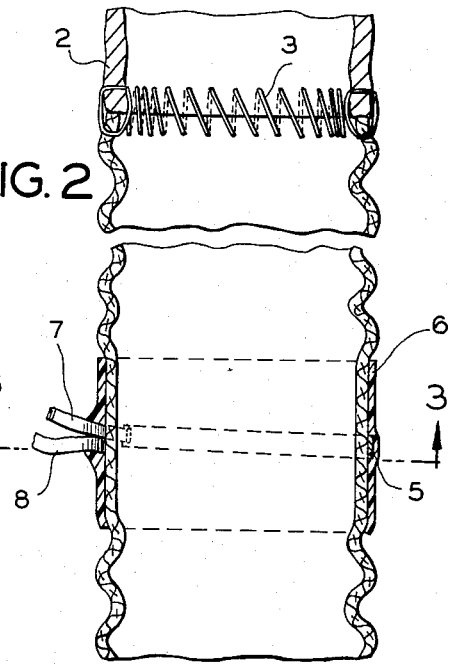
FIGURE 2 is a cross section view taken along line 2—2 of FIGURE 1.

Looking now at FIGURE 2, there is shown a cross section of the device of FIGURE 1. The knitted tube 1 is grafted to the vessel by a through-and-through suture, as shown at 3 and 4. Tube 1 may be provided with a plurality of annular pleats or accordion folds to enhance its extensibility and flexibility.

A strain-responsive element 5 is bonded to tubular member 1 and embedded within a suitable elastomer covering 6. Although various elastomers such as silicon rubber may be used for covering 6, in a preferred embodiment, a polyurethane polymer has been found to be preferable. In addition to providing a flexible seal having suitable resiliency, this material is also biologically inert.

A necessary characteristic of the sealing material used for covering 6 is that it permanently retain its resilience throughout the temperature range encountered in use and will not exhibit cold flow. Additionally, it should have good electrical dielectric properties. The polyurethane polymer used in a preferred embodiment has a Shore A hardness of 73 and a percentage elongation of 350. Additionally, this material will retain its desired properties through a temperature range of −80 degrees to +350 degrees Fahrenheit. The knitted construction of tubular member 1 makes it somewhat porous and allows blood to seep through its wall until sufficient clotting has taken place in the interstices of the fabric. This porosity is considered to be a desirable feature since it permits subsequent ingrowth of fibrous tissue to provide firm attachment of new intima lining on the inner surface. Blood loss from seepage through member 1 may be minimized by proper pre-clotting before allowing the full force of blood to flow through the graft. As a result of the normal clotting mechanism, the interstices will be occluded by fibrant.

As can be seen in FIGURE 2, the accordion pleats of tubular member 1 have been smoothed or flattened in the central section to facilitate the installation of the strain responsive element 5 and the encapsulating cover 6. Lead wires 7 and 8 are attached to the ends of the strain responsive element 5. These lead wires 7 and 8 are preferably covered with an insulating coating of biologically inert material such as nylon or Teflon. External ultilization circuits are to be connected to lead wires 7 and 8 as will be obvious to those skilled in the art.

Figure 3:
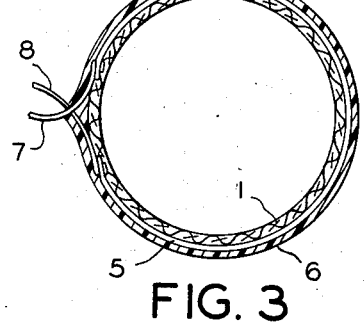
FIGURE 3 is a cross section view taken along line 3—3 of FIGURE 2.
Figure 4:
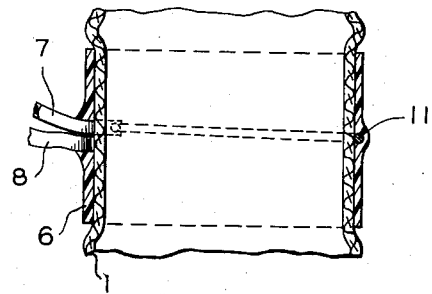
FIGURE 4 is an alternative embodiment of the apparatus of FIGURE 2 employing a strain-responsive resistance wire in lieu of a strain-responsive semiconductor filament.

As can be seen in FIGURE 3, the strain responsive element 5 completely encircles the knitted tube 1 except for a small gap separating the ends thereof. If desired, a plurality of turns may be employed rather than the single turn illustrated, as may be desirable when using particular types of strain responsive elements.

Figure 5:
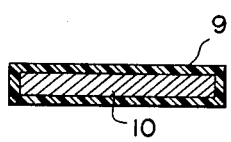
FIGURE 5 is a cross section view taken along line 5—5 of FIGURE 1.

While in the preferred embodiment, the strain responsive element 5 comprises a filamentary semiconductor type of strainggage, a strain wire 11 may be used in lieu of the semiconductor filament 5. Such strain wires are well known to those versed in the art and use the change in electrical resistance of the wire under tension to measure pressure. An insulating covering 9 is shown surrounding the conductor 10 of lead wires 7 and 8 in FIGURE 5.

Blood passing through aorta 2 will distend the vessel walls in the region of the blood pressure pulse wave and the locally distended region will constitute a bolus. The migration of this bolus through tubular member 1 will expand and tend to stretch the strain responsive element 5 thereby changing its electrical resistance. Any suitable means may be used to measure this resistance change such as a Wheatstone bridge or other well known electrical resistance measuring instrument.

As can be seen, any change in fluid pressure within the resilient conduit bounded by tubular member 1 will cause a resultant change in the diametral parameter of the conduit and will result in a corresponding change in the tension exerted on the strain responsive element 5 or 11. A resistance change occurs in response to a change in tension applied to element 5 or 11 and this resistance change it directly proportional to the change in fluid pressure.

Various means may be employed to couple the transducer to external utilization equipment and may include both direct wire connections or a radio link such as that entitled Internal Blood Pressure Monitoring System described in co-pending application of George H. Sullivan, Serial No. 122,267, filed July 6, 1961, and of common assignee herewith.

While there have been shown and described and pointed out the fundamental novel features of the invention as applied to preferred embodiments, it will be understood that various omissions and substitutions and changes in the form and details of the device as illustrated and in their operation may be made by those skilled in the art, without departing from the spirit of the invention; therefore, it is intended that the invention be limited only as indicated by the scope of the following claims.

What is claimed is:

1. A transducer for measuring the pressure of a fluid flowing in a conduit comprising a resilient integral tubular member having inlet and outlet connections for series connection into said conduit whereby said fluid may continuously flow therethrough, a strain responsive filament encircling said conduit and having first and second terminals, first and second lead wires connected to said first and second terminals, respectively, and extending away from said conduit for providing a pressure signal, and an impervious flexible covering sealing said strain responsive element to said tubular member.

2. The apparatus as defined in claim 1 wherein said tubular member comprises a biologically inert knitted fabric tube.

3. The apparatus as defined in claim 1 wherein said strain responsive means comprises a semiconductor strain gage.

4. The apparatus as defined in claim 1 wherein said covering comprises a polyurethane elastomer.

5. A dynamic blood pressure transducer having inlet and outlet connections for series connection into the ends of a severed blood vessel comprising a seamless fabric tube knitted from a biologically inert synthetic fiber and having a plurality of longitudinal accordion folds, a semiconductor strain gage substantially encircling said tube, an impervious elastomer sealing said straing gage to said tube, and a pair of lead wires connected to said strain gage for providing a pressure signal varying with blood pressure.

6. A transducer as defined in claim 5 wherein said tube has a porosity such that blood will seep through its walls and clot in the interstices of said fabric until all said interstices are occluded.

7. A dynamic blood pressure transducer comprising a seamless fabric tube knitted from a biologically inert fiber and having a plurality of longitudinal accordion folds, said tube being inserted between severed ends of a blood vessel and each end of said tube being secured to a severed end of said blood vessel in order to place said tube in series with said severed blood vessel, a semiconductor strain gage substantially encircling said tube, a covering of polyurethane elastomer sealing said strain gage to said tube, and a pair of lead wires connected to said strain gage for providing a pressure signal varying with blood pressure.

References Cited in the file of this patent

UNITED STATES PATENTS

| | | |
|---|---|---|
| 1,861,999 | Bowlus | June 7, 1932 |
| 2,658,505 | Sheer | Nov. 10, 1953 |
| 2,702,354 | Chorpening | Feb. 15, 1955 |
| 2,753,863 | Bailey | July 10, 1956 |
| 2,976,865 | Shipley | Mar. 28, 1961 |

OTHER REFERENCES

Hufnagel: pp. 636–645 of Annals of Surgery, May 1958.

Lillehei: pp. 2006–2010 of JAMA, Apr. 30, 1960.